United States Patent [19]
Graeff

[11] Patent Number: 6,111,928
[45] Date of Patent: *Aug. 29, 2000

[54] TOP MOUNT CANOPY SEAL CLAMP ASSEMBLY

[75] Inventor: Kurt R. Graeff, Windsor, Conn.

[73] Assignee: Combustion Engineering, Inc., Windsor, Conn.

[*] Notice: This patent issued on a continued prosecution application filed under 37 CFR 1.53(d), and is subject to the twenty year patent term provisions of 35 U.S.C. 154(a)(2).

[21] Appl. No.: 09/070,846

[22] Filed: Apr. 28, 1998

Related U.S. Application Data

[60] Provisional application No. 60/057,318, Sep. 29, 1997.

[51] Int. Cl.[7] ............................ G21C 13/00; G21C 13/302; G21C 13/04
[52] U.S. Cl. ........................... 376/204; 376/203; 376/205
[58] Field of Search ................................. 376/203–205, 376/234, 239, 245; 285/350, 406, 415

[56] References Cited

U.S. PATENT DOCUMENTS

| | | | |
|---|---|---|---|
| 3,926,722 | 12/1975 | Dupen | 176/87 |
| 4,240,650 | 12/1980 | Adams | 285/10 |
| 4,480,841 | 11/1984 | Schukei et al. | |
| 4,611,813 | 9/1986 | Guerrero | |
| 4,655,483 | 4/1987 | Margotta | |
| 4,676,573 | 6/1987 | Norman | |
| 4,709,729 | 12/1987 | Harrison | 138/99 |
| 4,723,795 | 2/1988 | Shenoy | |
| 4,826,217 | 5/1989 | Guerrero | |
| 4,834,935 | 5/1989 | Daigel et al. | |
| 5,006,300 | 4/1991 | Jonsson et al. | 376/203 |
| 5,316,319 | 5/1994 | Suggs | 277/106 |
| 5,323,428 | 6/1994 | Porter et al. | |
| 5,377,235 | 12/1994 | Kwech | 376/245 |
| 5,426,676 | 6/1995 | Hopkins | 376/203 |
| 5,513,227 | 4/1996 | Margotta et al. | |
| 5,605,361 | 2/1997 | Sims | 285/206 |
| 5,619,546 | 4/1997 | Porter et al. | 376/204 |
| 5,631,936 | 5/1997 | Theroux et al. | 376/204 |
| 5,918,911 | 7/1999 | Sims | 285/13 |

FOREIGN PATENT DOCUMENTS

| | | | |
|---|---|---|---|
| 2614426 | 6/1977 | Germany | 376/203 |
| 479 015 | 9/1969 | Switzerland | |

*Primary Examiner*—Charles T. Jordan
*Assistant Examiner*—Jack Keith
*Attorney, Agent, or Firm*—Ronald P. Kananen; Rader, Fishman & Grauer

[57] ABSTRACT

A top mount canopy seal mechanical clamp assembly 20 for repair of a leaking canopy seal weld 16 between a nuclear reactor head penetration nozzle 12 and a mating part 14 has an annular housing 24 with insert support halves 28 and 30 for surrounding the nozzle. A top plate 34 is urged toward the support halves and housing by Belleville washers mounted on cap screws 42 threaded in bores 44 of the housing. A flexible graphite seal annulus 22 is compressed by the clamping action against the canopy seal weld 16 to create a flexible graphite leak stopping seal at the weld.

5 Claims, 1 Drawing Sheet

TOP MOUNT CANOPY SEAL CLAMP ASSEMBLY

CROSS REFERENCE TO RELATED APPLICATION

The subject matter of the present application is disclosed in applicants' co-pending Provisional U.S. patent application No. 60/057,318, filed Sep. 29, 1997, from which priority is claimed.

BACKGROUND OF THE INVENTION

1. Field of the Invention

The present invention relates to nuclear power reactors, and more particularly, to a method and apparatus for sealing leaking welded penetrations to the head of a nuclear reactor vessel.

On typical pressurized water nuclear reactors, a plurality of control rod drive mechanisms (CRDM) are mounted on the vessel head. The mechanisms are located in pressure boundary housings and provide controlling motion to the neutron absorbing control rods. The components which make up the housings are assembled to each other and jointed with omega sealed welds. A canopy seal omega weld is between the reactor vessel head CRDM nozzle and the mating part (see FIG. 1). This weld has a tendency to develop cracks as a result of stress corrosion cracking. These cracks typically propagate through the weld until leakage occurs.

It is a common design to have reactor vessel head nozzles at every potential control rod position. A majority of the nozzles are used for control rods, a smaller number are used for core-exiting thermocouple instrumentation and several others (spares) are capped.

2. Description of the Prior Art

The repairs to leaking canopy seal welds are laborious and time consuming because they must be performed in a confined, highly radioactive area. Typically, the omega seal leaks have been fixed by shutting down the plant, draining down the reactor coolant to a level below the reactor vessel head and applying a weld overlay to the leaking location. This process takes a large amount of time, gives the workers a large dose of radioactivity due to the close proximity and contact with the reactor vessel head, and is no different than the existing weld, which means that it could leak again in the same location.

SUMMARY OF THE INVENTION

It is an object of the invention to provide a top mount canopy seal clamp assembly (TM-CSCA) as a non-welded mechanical method and device for stopping leaking in a canopy seal weld. The TM-CSCA seals the leaking weld and introduces a compressive load into the canopy seal, which tends to close and arrest the crack propagation. The TM-CSCA seals the leaking weld by compressing a flexible graphite seal over the entire annular canopy seal weld area. The flexible graphite seal material is preferably GRAFOIL® available from the Union Carbide Corporation.

The top mounted canopy seal clamp assembly has three major advantages over weld repair options, in that it will save time, radiation dosage, and re-occurrence of the leak.

A distinct advantage of the TM-CSCA over the weld repair options is that installation can be completed without "draindown" of the reactor coolant system. This is a major advantage, because the majority of leaks are found during plant start-up after an outage. For the best weld repair, it is required that there be no water (or moisture) in the nozzle. Therefore, time is saved by not having to "draindown" for repair.

The TM-CSCA will also save radiation dosage. The weld repair requires a crew to be within close proximity with the reactor vessel head nozzles (high dose area), for a comparable amount of time. The TM-CSCA is installed from the top of the reactor vessel head lift rig (much lower dose area), with long handle tools. Therefore, the TM-CSCA worker receives a smaller amount of radiation dosage than that worker doing a weld repair.

A leak is less likely to reoccur on a nozzle that has been repaired with a TM-CSCA, than a nozzle that has been weld repaired. This is because the TM-CSCA introduces a compressive load into the canopy seal, which tends to close and arrest the crack propagation. The weld repair is no different than the weld that previously exists. Therefore, the TM-CSCA repairs the leak, and prevents future leaks from occurring.

The TM-CSCA is installed remotely, from the top of the reactor vessel head (approximately 20 feet from the nozzle), with specially designed long handled tools. The housing is lowered over the nozzle to be repaired, below the penetration or nozzle flange. The first support half is lowered and placed into the housing; then the second support half is installed in the same manner. The flexible graphite seal ring and seal support ring are then lowered into the canopy seal weld to be repaired. The top plate is then lowered to compress the flexible graphite seal ring into place. The cap screws with belleville washers are then installed to provide the necessary retaining loading force.

DETAILED DESCRIPTION OF THE PREFERRED EMBODIMENT

Figure 1:
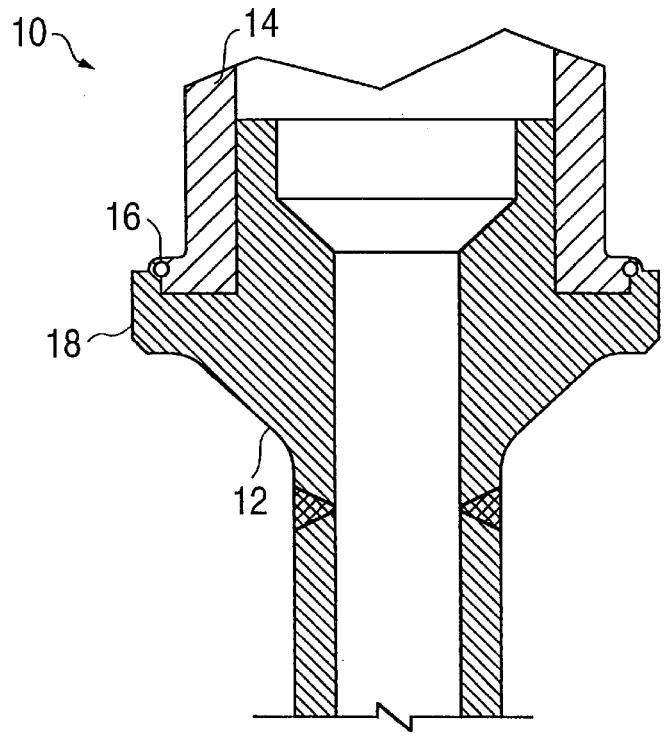
FIG. 1 is a schematic side elevational view in cross section of the annular canopy seal weld configuration between a control rod drive mechanism (CRDM) nozzle and a mating part as present on a prior art typical reactor vessel head.

The numeral 10 generally designates a typical prior art annular canopy seal weld configuration between a control rod drive mechanism nozzle 12 of a reactor vessel head (not shown) and a mating part 14. The mating part 14 could be a spare capped CRDM, a core exiting thermocouple nozzle assembly or a CRDM housing. It mates with a nozzle flange 18.

A canopy seal 16, called an "omega seal" because of its shape, is described in U.S. Pat. No. 5,631,936 assigned to the same assignee as the instant application.

The omega seal of that patent is a flexible graphite seal, although the configuration of the canopy seal of the instant arrangement is different in that it is on the top of the nozzle 12 and requires that the applied seating pressure comes from a compressing top plate of the novel top mount canopy seal mechanical clamp assembly of the invention generally designated 20 rather than from the housing 14 (or cap) itself.

Figure 2:
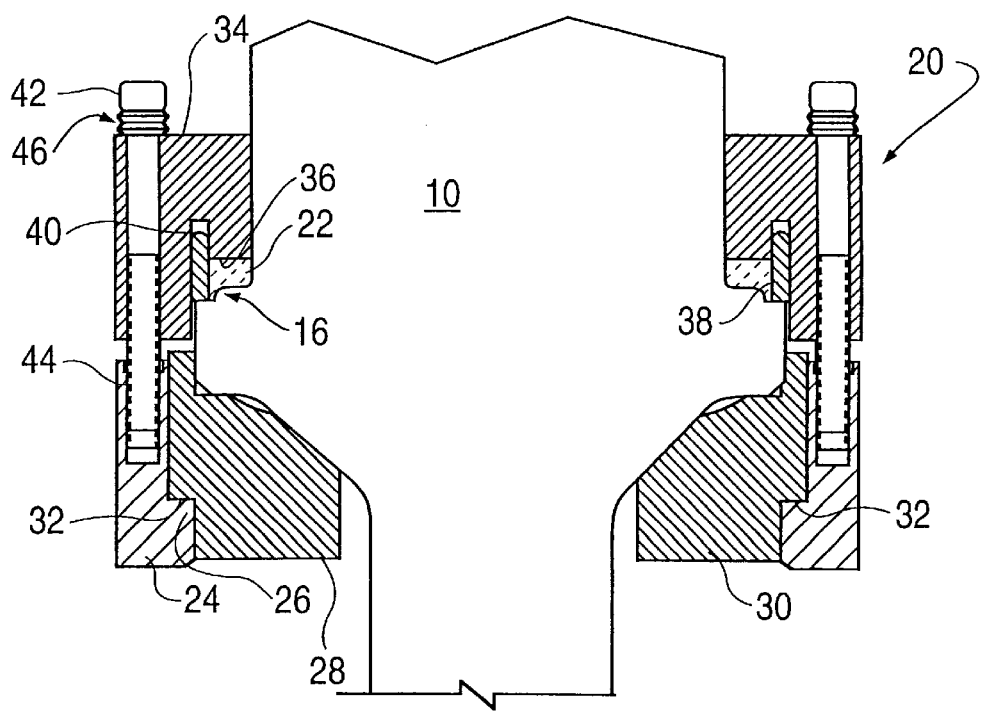
FIG. 2 is a schematic side elevational view in cross section of the annular top mount canopy seal mechanical clamp assembly in position and applying a compressive load to create a flexible graphite leak stopping seal at the annular canopy seal weld.

The top mount canopy seal mechanical clamp assembly (TM-CSCA) 20, as seen in FIG. 2, is made of stainless steel and is designed to repair leaking in the canopy seal 16 weld. This weld, and thus seal 16, has a tendency to develop cracks as a result of mechanical stress and/or stress corrosion cracking. These cracks propagate through the weld wall until leakage occurs.

The TM-CSCA 20 is a non-welded mechanical method of stopping leakage in the canopy seal weld 16. The TM-CSCA 20 seals the leaking weld 16 and introduces a compressive load into the canopy seal, which tends to close and arrest the crack propagation. The TM-CSCA 20 seals the leaking weld by compressing a flexible graphite seal 22 over the entire annular seal weld area 16 as shown in FIG. 2. The flexible graphite seal material is preferably GRAFOIL® available from the Union Carbide Corporation.

The TM-CSCA 20 has an annular housing 24 which is lowered below the flange 18 of nozzle 12. Housing 24 has a radially inwardly directed flange 26 of such dimension as to permit it to telescopically pass the nozzle flange 18 having the canopy seal weld 16.

Insert support halves 28 and 30 are lowered and placed in the housing 24 one at a time. The halves 28 and 30 are of semi-annular shape and are seated concentrically with an annular shoulder 32 thereof in face to face engagement with an axially facing inner surface of the annular hollow housing flange 26.

An annular top plate 34 of stainless steel is placed in register concentrically with the annular hollow housing 24 and surrounds the annular canopy 10. A seal seat 36 is provided in top plate 34 over and radially outward of canopy seal 16. An annular seal support ring 38 fits in a slot 40 in top plate 34 to confine the flexible graphite seal 22 over the annular seal weld area 16. The slot 40 is deeper than the width of ring 38 to permit movement of top plate 34 relative to insert support halves 28 and 30 by means of cap screws 42 engaging threaded bores 44 in housing 24. In this way cap screws 42 can draw the top plate 34 and housing 24 together to create compressive force on the flexible graphite seal 22 against canopy seal weld 16 to create a flexible graphite leak stopping seal at the weld 16.

The cap screws 42 are provided with Belleville washers 46 between their heads and the top plate 34 to provide and maintain the necessary retaining loading force.

What is claimed is:

1. A top mount canopy seal mechanical clamp assembly for repair of a leaking canopy seal weld located on a top surface of a nozzle, comprising:

an annular hollow housing having a radially inwardly directed flange of such dimension as to permit it to telescopically pass a nozzle flange having said canopy seal weld;

insert support halves of semi-annular shape concentric within said annular hollow housing and having an annular shoulder for face-to-face engagement with an axially facing inner surface of said annular hollow housing flange;

an annular hollow top plate including an annular slot;

said top plate in register concentrically with said annular hollow housing and surrounding said nozzle; a seal seat in said top plate positioned over and radially outward of said canopy seal weld in which a flexible graphite annulus is mounted for engagement with said canopy seal weld;

an annular seal support ring positioned within said annular slot and arranged to completely surround said flexible graphite annulus to confine said flexible graphite annulus over said canopy seal weld;

cap screws drawing said top plate and said housing together;

whereby the clamp assembly introduces a compressive load into said flexible graphite annulus and against said canopy seal weld to create a flexible graphite leak stopping seal at the weld.

2. The clamp assembly of claim 1, further comprising Belleville washers positioned between respective heads of said cap screws and said top plate to provide and maintain a necessary retaining loading force.

3. The clamp assembly according to claim 1, wherein said insert support halves each have an upper surface shaped to correspond with a lower surface of said nozzle to engage said lower surface of said nozzle directly.

4. In combination, a nozzle having a canopy seal weld located on a top surface thereof and a canopy seal mechanical clamp assembly for repairing a leak in said canopy seal weld, comprising:

an annular hollow housing having a radially inwardly directed flange of such dimension as to permit it to telescopically pass a flange of said nozzle having the canopy seal weld;

insert support halves of semi-annular shape concentric within said annular hollow housing and having an annular shoulder in face-to-face engagement with an axially facing inner surface of said annular hollow housing flange, said insert support halves each having an upper surface engaging a lower surface of the nozzle;

an annular hollow top plate in register concentrically with said annular hollow housing and surrounding the nozzle, said top plate including an annular slot therein;

a seal seat in said top plate positioned over and radially outward of said canopy seal weld in which a flexible graphite annulus is mounted for engagement with said canopy seal weld;

an annular seal support ring positioned within said annular slot and arranged to completely surround said flexible graphite annulus to confine said flexible graphite annulus over said canopy seal weld; and cap screws drawing said top plate and said housing together and placing a compressive load into said flexible graphite annulus and against said canopy seal weld to create a flexible graphite leak stopping seal at the weld.

5. The combination of claim 4, further comprising Belleville washers positioned between respective heads of said cap screws and said top plate to provide and maintain a necessary retaining loading force.

* * * * *